(No Model.) 2 Sheets—Sheet 1.
E. RECORDON.
ELECTRIC MOTOR FOR SEWING MACHINES.
No. 353,003. Patented Nov. 23, 1886.
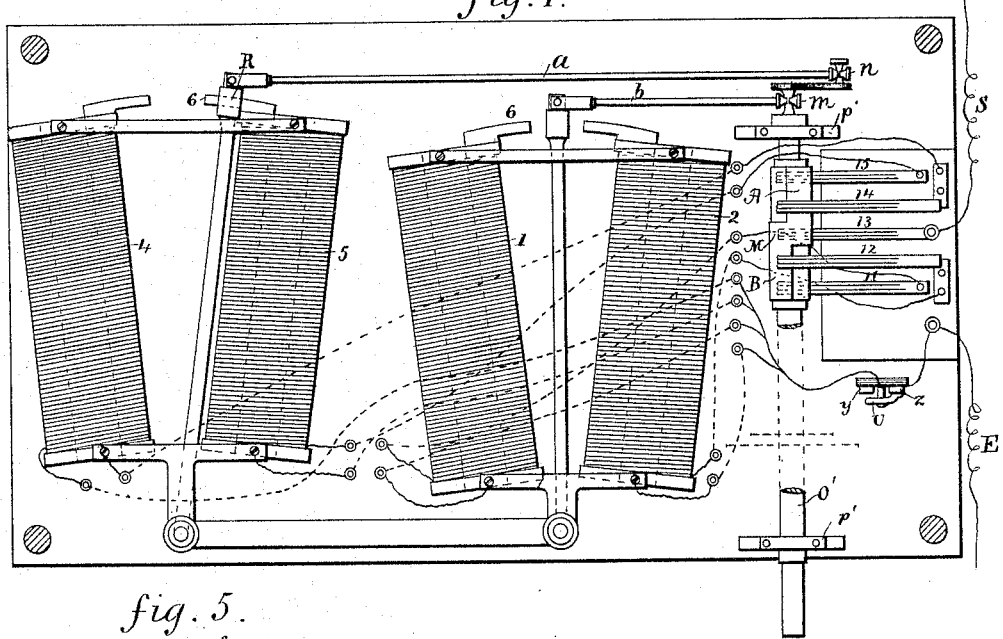
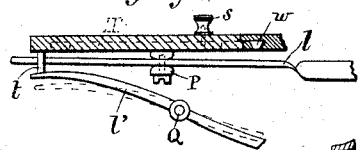
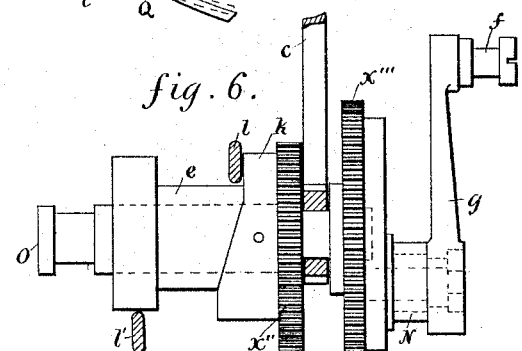
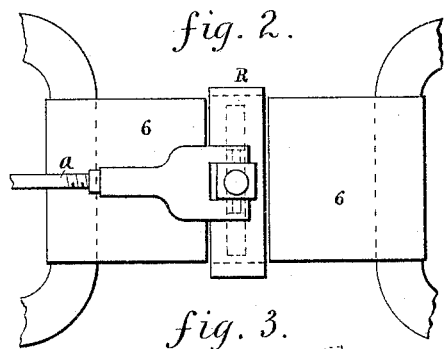
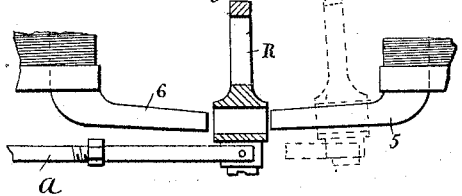
Attest:
Jas. K. McCathran
L. W. Hopkins
Inventor:
Ernest Recordon by
A Pollok his atty.

(No Model.) 2 Sheets—Sheet 2.

E. RECORDON.
ELECTRIC MOTOR FOR SEWING MACHINES.

No. 353,003. Patented Nov. 23, 1886.

Witnesses,

Inventor
Ernest Recordon

UNITED STATES PATENT OFFICE.

ERNEST RECORDON, OF PARIS, FRANCE.

ELECTRIC MOTOR FOR SEWING-MACHINES.

SPECIFICATION forming part of Letters Patent No. 353,003, dated November 23, 1886.

Application filed June 23, 1886. Serial No. 206,028. (No model.)

*To all whom it may concern:*

Be it known that I, ERNEST RECORDON, a citizen of Switzerland, and a resident of Paris, in the Republic of France, have invented a new and useful Improvement in Electric Motors for Sewing-Machines, which improvement is fully set forth in the following specification.

This invention consists in a new or improved form of electrical motor, and also in a special arrangement of mechanism of which an electrical motor forms part, whereby a needle, shuttle, and feed-bar, or equivalent stitch-forming devices, are or may be operated; and it further comprises certain special constructions, combinations, and arrangements of parts, as hereinafter set forth.

Figure 7:
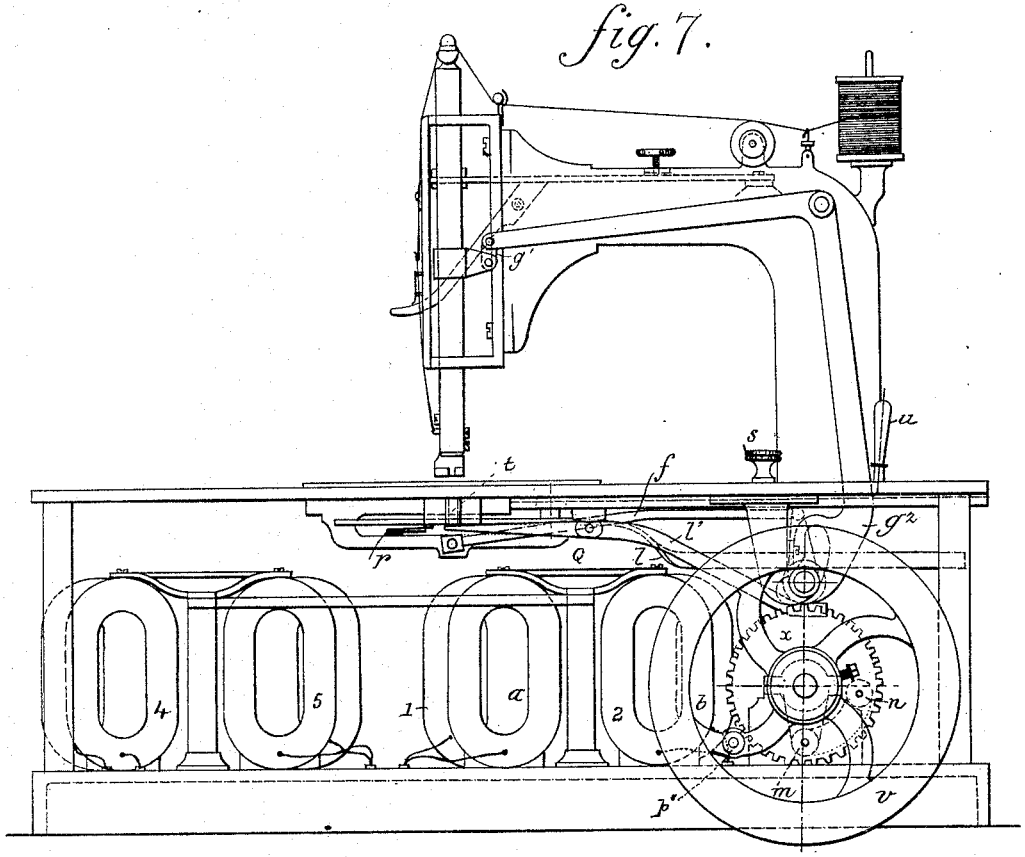
Figure 8:
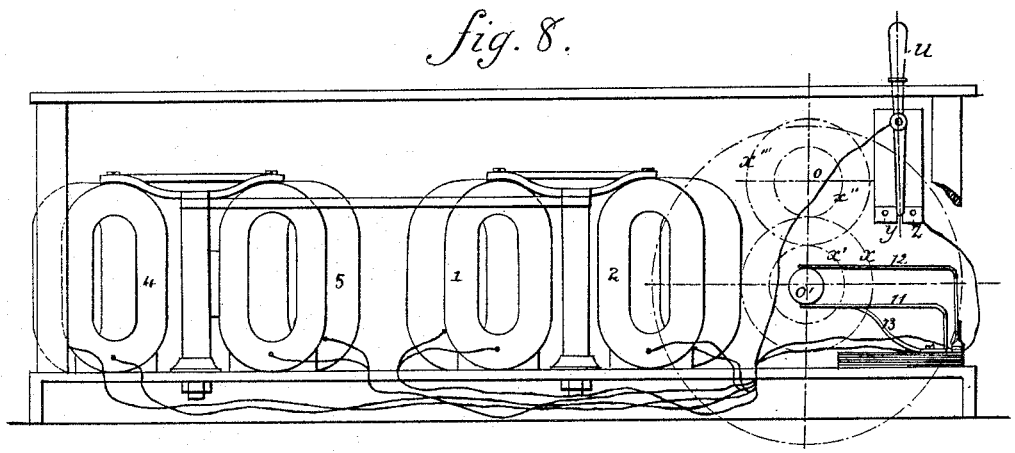

In the accompanying drawings, which form part of this specification, Figure 1 is a plan of the electrical motor; Figs. 2, 3, and 4, detail views of the same; Figs. 5 and 6, detail views of devices operated by the motor; Fig. 7, an elevation of a sewing-machine and electrical motor combined, and Fig. 8 an elevation of the motor, certain parts in both Figs. 7 and 8 being omitted for simplicity and clearness of illustration.

The electrical motor consists, as shown, of four electro-magnets, 1 2 4 5, (see Fig. 1,) arranged in pairs. Between the magnets of each pair there is an armature, R, hinged at the end farthest removed from the poles of the magnets, and playing between and over the poles 6 of the magnets. The shape of the poles is shown in Figs. 1, 2, and 3, and so also is that of the end of the armature, which latter is made with an opening through it in order that it may pass freely over the poles. Each armature is connected by a pitman, $a$ $b$, respectively, with a crank, $m$ $n$, respectively, on the shaft $o'$.

Two pairs of magnets are used, and the cranks are set ninety degrees apart, so as to avoid dead-centers. The shaft $o'$ is mounted in bearings $p'$, and carries at its front end a fly-wheel, $v$, which has a crank-handle, $p''$, for turning it by hand when required. The shaft $o'$ carries the commutator for supplying the electric current from a galvanic battery, a secondary battery, or other source of electricity to the bobbins of the electro-magnets in the proper succession. This commutator consists of a metal cylinder, M, with a projection, A B, respectively, on each side, as shown best in Fig. 4. It is insulated from the shaft and turns with it. The spring 13 bears constantly upon the cylinder M, and serves to put it in constant communication with the wire S from one terminal of the generator of electricity. The springs 11 and 12 are arranged opposite the projection B, one above and one below the shaft $o'$, so that they make contact therewith alternately, and thus are alternately put in electrical connection with the wire S. The springs 14 and 15 in like manner are placed opposite the projection A—one above and one below the shaft. One terminal of each bobbin is led to one of the springs 11, 12, 14, and 15, and the other terminal is led to the lever U of a two-point switch. One point or contact-piece, $z$, is connected with the terminal wire E of the generator or source of electricity, the other, $y$, being open, so that by turning the lever to one point or the other the electricity is cut off or is permitted to pass into and through the coils of such of the bobbins as at the time have their circuit completed through the commutator.

The shaft $o$, from which the needle, feed, and shuttle of the sewing-machine receive their motion, is driven from the shaft $o'$ by the spur-gear $x$ or $x'$ on shaft $o'$ engaging the corresponding spur-gear $x''$ or $x'''$ on shaft $o$. Either pair of gears can be put into engagement to change the speed by moving one shaft longitudinally with respect to the other.

The feed-bar $t$ is controlled by the cams $k$ and $e$. The cam $k$ acts through lever $l$ to control the back-and-forth motion. The cam $e$ acts through the lever $l'$ to control the rising-and-falling motion. The spring $r$, Fig. 7, returns the feed-bar when the cams permit. This spring serves, also, to keep the levers $l$ $l'$ in contact with their respective cams. The lever $l$ is fulcrumed on a vertical pin, P, and the lever $l'$ on a horizontal pin, Q. The pin P is carried by a slide, T, which can be adjusted in ways $w$ on the under side of the bed-plate of the sewing-machine. A set-screw, $s$, holds the slide in the position to which it may be adjusted. The adjustment of the fulcrum P regulates the length of the stitch made by the machine.

The needle-lever $g^2$, fulcrumed on the stationary arm or goose-neck of the sewing-machine, is connected at one end with the needle-bar by a short link, $g'$, as common in sewing-machines, and at the other is engaged by the crank-pin N, which works in a recess in the end of the lever of suitable shape, so that the movements imparted to the needle are properly timed with reference to the shuttle.

The shuttle is or may be supported by a shuttle-driver in a shuttle-race, as common in sewing-machines. It is moved back and forth by the crank $g$ on shaft $o$ through the pitman $f$. The fly-wheel $v$ is held by a set-screw, so that it can be temporarily disconnected for winding bobbins. It can be turned by the crank-handle $p''$.

The shafts $o\ o'$, it will be observed, are placed under the standard of the goose-neck, at right angles to the horizontal arm of said goose-neck, and the magnets of the motors are placed horizontally side by side, with their axes in the same general direction, thus making a very compact arrangement, and enabling comparatively long pitmen to be used between the armatures and the motor-shaft. This arrangement, although preferred and the subject of special claim, is not essential to the invention.

The motor may evidently be used to drive other than sewing mechanisms. It is also evident that the materials, proportions, and dimensions, as well as accessory parts, can be varied at will, or within wide limits. The position and number of the electro-magnets may of course be changed, and the machine may be mounted on a simple table of wood, or on a special base of cast-iron, or otherwise.

Having thus described my invention, what I claim is—

1. In an electric motor, the combination, with electro-magnets arranged in pairs, of an armature or armatures—one for each pair—hinged at the base of the magnets, and having openings therein, the poles of said magnets being of a size to enter said openings, substantially as described.

2. The combination, with a pair of electro-magnets placed side by side and having poles turned toward each other, of an armature movable back and forth lengthwise of said poles, and a commutator operated by said armatures for controlling the current through said magnets, substantially as described.

3. The combination of electro-magnets placed side by side and having their poles turned toward each other, an armature formed of a bar placed lengthwise of said magnets and pivoted so that it may vibrate between and lengthwise of the poles of the magnets, a rotary shaft, a commutator thereon, and a pitman connecting the armature with a crank on said shaft, substantially as described.

4. The combination of two or more electro-magnets, armatures placed lengthwise of said magnets between the poles, and pivoted at the ends farthest from the poles, a shaft having cranks connected by pitmen with said armatures and arranged one in advance of the other, so as to avoid dead-centers, and a commutator on said shaft for supplying current to the magnets in proper succession, substantially as described.

5. The combination, with the frame and stitch-forming mechanism of a sewing-machine, of the shafts arranged under the standard of the goose-neck at right angles to the length of the stationary arm, the cranks and cams on said shafts, the magnets placed side by side and alongside of said shafts, the reciprocatory armatures, the pitmen, and the commutator, substantially as described.

In testimony whereof I have signed this specification in the presence of two subscribing witnesses.

ERNEST RECORDON.

Witnesses:
  ROBT. M. HOOPER,
  A. ROUSSEL.